United States Patent [19]

Gilchrist

[11] Patent Number: 4,878,698
[45] Date of Patent: Nov. 7, 1989

[54] RESTRAINING PIPE JOINT

[76] Inventor: R. Fowler Gilchrist, 2409 Farington Rd., Witchita Falls, Tex. 76308

[21] Appl. No.: 257,241

[22] Filed: Oct. 13, 1988

Related U.S. Application Data

[63] Continuation-in-part of Ser. No. 2,322, Jan. 12, 1987, abandoned.

[51] Int. Cl.⁴ ............................................. F16L 23/02
[52] U.S. Cl. ................................... 285/342; 285/343; 285/332; 285/348; 285/368
[58] Field of Search ............... 285/114, 368, 337, 343, 285/342, 340, 332, 334.4, 175

[56] References Cited

U.S. PATENT DOCUMENTS

| | | | |
|---|---|---|---|
| 1,423,754 | 7/1922 | Clark | 285/368 |
| 1,556,745 | 10/1925 | Banta | 285/374 |
| 1,588,444 | 6/1926 | Carson | 285/374 |
| 1,868,014 | 7/1932 | Lucas | 285/368 |
| 1,873,620 | 8/1932 | Moore | 285/348 |
| 2,070,855 | 2/1937 | Bronsell | 285/368 |
| 2,347,044 | 4/1944 | Frances | 285/342 |
| 2,349,180 | 5/1944 | Lamont | 285/342 |
| 2,351,363 | 6/1944 | Parker et al. | 285/382.7 |
| 2,396,163 | 3/1946 | Dies | 285/382.7 |
| 2,711,913 | 6/1955 | Jungblut | 285/39 |
| 2,832,615 | 4/1958 | Summers | 285/368 |
| 3,498,647 | 3/1970 | Schroder | 285/343 |
| 3,652,110 | 3/1972 | Manton | 285/368 |
| 3,726,549 | 4/1973 | Bradley, Jr. | 285/374 |
| 3,815,940 | 6/1974 | Luckenbill | 285/342 |
| 3,848,905 | 11/1974 | Hammer et al. | 285/342 |
| 3,869,156 | 3/1975 | O'Brien et al. | 285/374 |
| 3,920,270 | 11/1975 | Babb, Jr. | 285/368 |
| 4,043,576 | 8/1977 | Reich et al. | 285/342 |
| 4,062,572 | 12/1977 | Davis | 285/382.7 |
| 4,119,335 | 10/1978 | Rieffle et al. | 285/368 |
| 4,183,560 | 1/1980 | Wyss | 285/348 |
| 4,256,335 | 3/1981 | Nielsen, Jr. | 285/382.7 |
| 4,309,050 | 1/1982 | Legris | 285/342 |
| 4,540,204 | 9/1985 | Battle et al. | 285/374 |
| 4,610,471 | 9/1986 | Halen et al. | 285/368 |

FOREIGN PATENT DOCUMENTS

| | | |
|---|---|---|
| 721248 | 6/1942 | Fed. Rep. of Germany . |
| 369940 | 7/1963 | Switzerland . |
| 2157785 | 10/1985 | United Kingdom . |

Primary Examiner—Randolph A. Reese
Assistant Examiner—Anthony Knight
Attorney, Agent, or Firm—David H. Semmes

[57] ABSTRACT

Pipe joints, particularly a restraining joint for use in bell and plain pipe end assemblies. The joint includes a gland having a conical axial aperture which encircles the plain end of the pipe; a split ring also encircling the plain end of the pipe is set in juxtaposition with the gland and this ring includes a peripheral flange which seats in the gland. The split ring has a conical exterior complementally engaging the conical axial aperture in the gland and a plurality of pipe gripping teeth defined in its inner surface. A compressible gasket is interposed between the split ring and the pipe bell. The restraining joint is particularly effective in joining plastic pipe and bell assemblies.

4 Claims, 2 Drawing Sheets

RESTRAINING PIPE JOINT

CROSS-REFERENCE TO RELATED APPLICATIONS

Applicant filed Disclosure Document No. 134,430on Jan. 28, 1985.

The present application comprises a continuation-in-part of patent application Ser. No. 002,322, filed 01/12/87, entitled RESTRAINING PIPE JOINT now abandoned.

BACKGROUND OF THE INVENTION

1. Field of the Invention

Pipe joints, particularly a restraining joint for use in a bell and plain pipe end assembly, using a metallic gland and plastic pipe, together with a gripping ring and compressible gasket interposed between the bell and the gland. The restraining joint restrains the abutting plastic pipe ends against axial movement under varying hydraulic pressure. Thereby, the restraining joint overcomes a principal difficulty in fitting hose line connections to municipal water systems.

2. Description of the Prior Art

The prior art is considered to be shown by the following references:

| UNITED STATES | |
|---|---|
| CLARK | 1,423,754 |
| BANTA | 1,556,745 |
| CARSON | 1,588,444 |
| LUCAS | 1,868,014 |
| BRONSELL | 2,070,855 |
| FRANCES | 2,347,044 |
| LAMONT | 2,349,180 |
| PARKER et al. | 2,351,363 |
| DIES | 2,396,163 |
| JUNGBLUT | 2,711,913 |
| SUMMERS | 2,832,615 |
| SCHRODER | 3,498,647 |
| MANTON | 3,652,110 |
| HAMMER et al. | 3,848,905 |
| O'BRIEN et al. | 3,869,156 |
| BABB Jr. | 3,920,270 |
| DAVIS | 4,062,572 |
| REICH et al. | 4,043,576 |
| RIEFFL et al. | 4,119,335 |
| WYSS | 4,183,560 |
| NIELSEN, Jr. | 4,256,335 |
| LEGRIS | 4,309,050 |
| BATTLE et al. | 4,540,204 |
| HALEN et al. | 4,610,471 |
| FOREIGN | |
| SWITZERLAND | 369,940 |
| GT. BRITAIN | 2,157,785 |

SUMMARY OF THE INVENTION

A restraining pipe joint for use in a bell and plain pipe end assembly, comprising a gland encircling the plain end of the pipe and a split ring encircling the plain end of the pipe in juxtaposition with the gland and a compressible gasket. Compressing of the gland with respect to the bell forces the split ring into a conical aperture in the gland, thus gripping the pipe with constant pressure and precluding axial movement of the pipe within the fitting. The relationship in assembly of contiguous surfaces of gland, split ring and gasket is critical.

DESCRIPTION OF THE PREFERRED EMBODIMENTS

Figure 1:
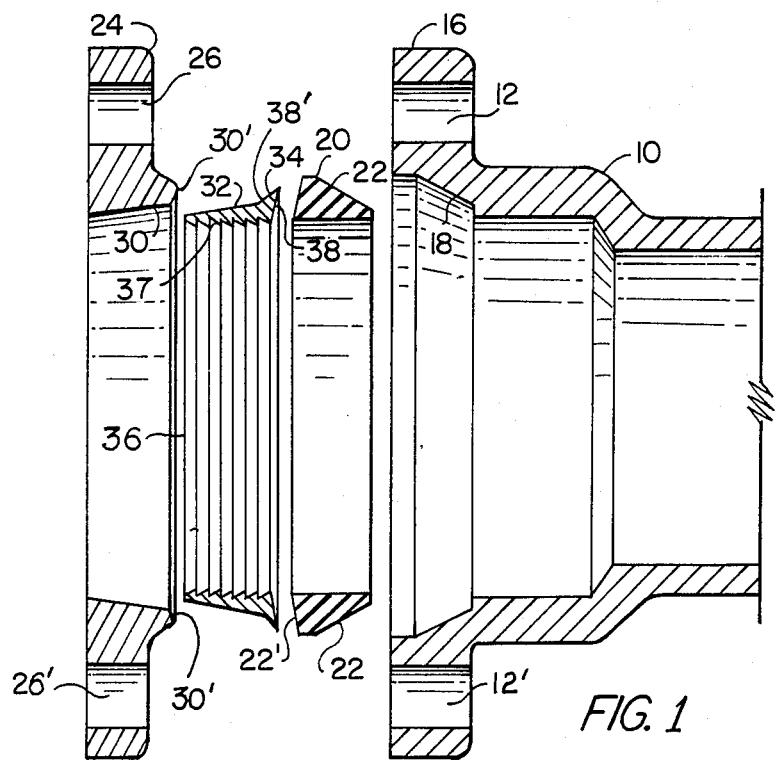
FIG. 1 is an exploded, vertical section of the gland, split ring, gasket and bell components in the restraining joint.
Figure 2:
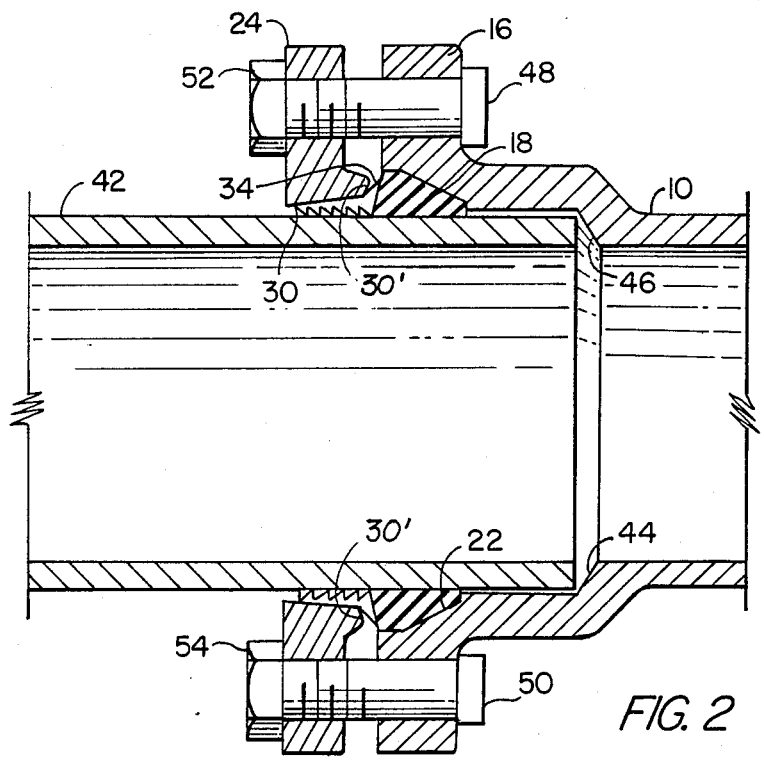
FIG. 2 is a fragmentary vertical view, showing fitting of the plain pipe end within the gland, split ring, gasket and bell components, precedent to complete assembly.
Figure 3:
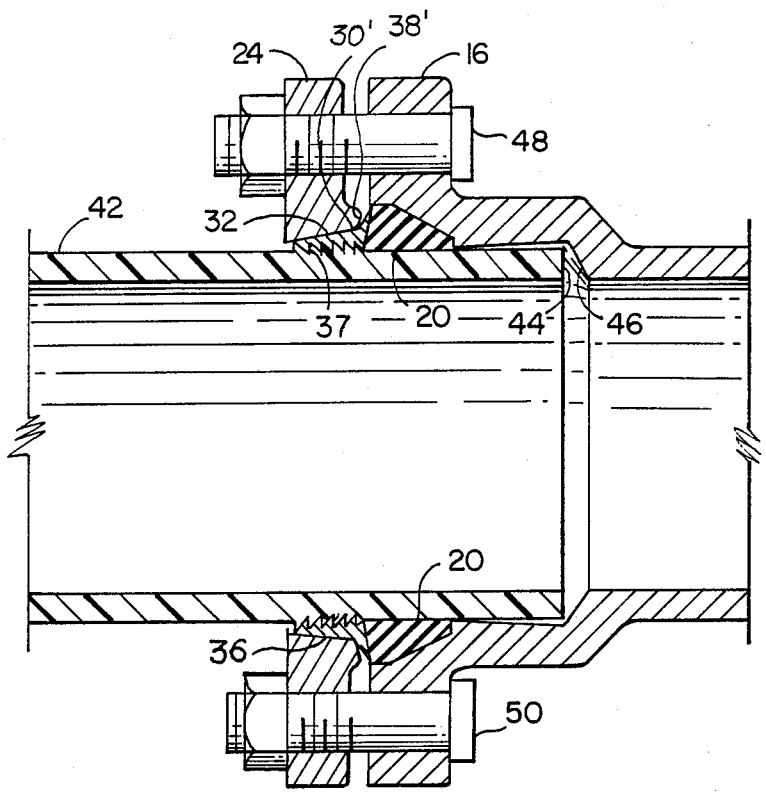
FIG. 3 is a fragmentary vertical section, showing the gland, split ring and gasket in complete assembly with bell and a plastic plain pipe end wherein the gasket is compressed between the gland, plain pipe end and bell components.

In FIG. 1 there is illustrated a somewhat conventional metal pipe bell 10 having peripheral flange 16 with apertures 12, 12' for securing bolts and a first inner shoulder 18 complementally engagable with inclined inner shoulder 22 of compressible gasket 20. The bell interior defines an opening wall of maximum radius relative to a center line of the joint, joining in a first conical shoulder 18 of declining radius said first conical shoulder terminating rearwardly in a second shoulder 18' of shortest radius, whereby to form within the bell a rearwardly extending recess 18" for the plain pipe end. Gasket 20 has an opposed inclined outer shoulder 22'. A cast iron or similar gland 24 having peripheral apertures 26, 26' aligned with bell apertures 12, 12' is shown as having a conical, axial aperture 30 which terminates short of its forward end to form in extension thereof an inclined peripheral abutment 30'. An elongated brass split ring 36 defines a conical exterior surface wall 32, which is complementally engagable by inner conical surface or aperture 30 of gland 24. This split ring 36 also defines a peripheral flange 34 with its forward inclined shoulder 38 of positive slope relative to a centerline of the pipe end, the same being engagable with the opposed inclined shoulder 22' of compressible gasket 20. As shown in FIGS. 2 and 3, the peripheral flange 34 of the split ring projects outwardly of the plain pipe end 42. The flange 34 thus further consists of two connected elements, namely at its forward end, an outer first elongated and inclined shoulder 38 which is inclined at a lesser angle than its inner rearward counterpart 38'. In short, the angular disposition of shoulders 38, 38' is such that shoulder 38' is of greater inclination relative to a centerline of pipe axis. Shoulder 30' of the gland and opposed shoulder 38' of the split ring are in such complemental angular relationship that upon assembly they obtain maximum contiguous contact. They approximate parallelism. The shoulder 38' is also shown to connect with the conical surface 32 of the split ring and comprises an extension thereof. As will appear hereinafter, these elements 38 and 38' of the split ring are correspondingly engageable with substantially parallel elements 22' and 30' respectively of the gasket and gland. See FIG. 3.

Figure 4:
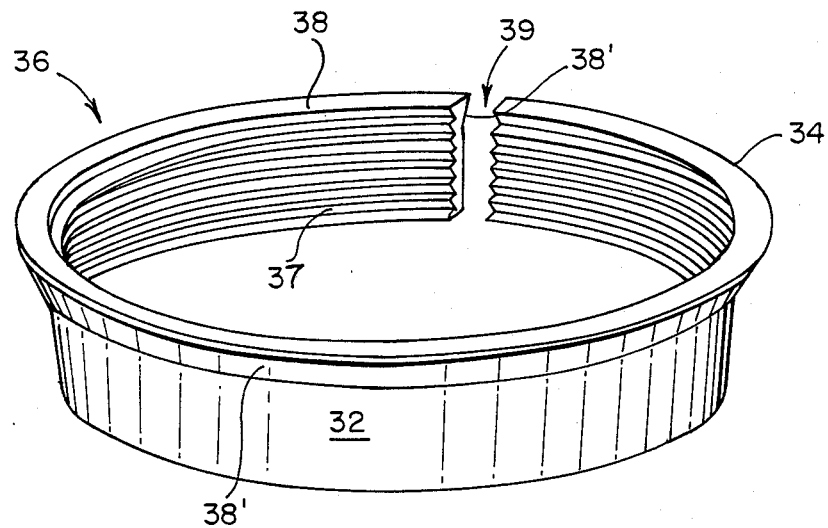
FIG. 4 is a perspective view of a metal brass split ring.

As illustrated in FIG. 4, split ring 36 has a longitudinally extending gap or split 39 so as to be coaxially compressible within the gland conical aperture 30, and its inclined peripheral abutment 30'. Also, inner teeth 37 of the ring are forwardly inclined so as to grip the plain pipe end both as gland 24 and bell 16 are compressed towards each other and as the pressure within the plastic pipe expands the diameter of the pipe.

As best illustrated in the FIG. 2 assembly, gland 24 inner surface 30 complementally engages the outer conical surface 32 of the split ring as the bolts 48, 50 are placed through apertures 12, 12', 26, 26' and are tightened by means of nuts 52, 54. Likewise the inclined peripheral abutment 30' of gland 24 engages its counterpart, the rearward extending shoulder 38' of the split ring 36.

As indicated heretofore, the assembly is shown tightened and compressed in FIG. 3 with split ring teeth 37 engaging the plastic pipe 42. The gland abutment against the split ring precludes shifting of the ring and compressible gasket 20, notwithstanding hydraulic pressure variations in the line flow. The engagement of teeth 37 into the plastic pipe 42 likewise prevents longitudinal movement due to varying hydraulic pressurization or other stress.

ASSEMBLY OF THE RESTRAINING JOINT

Referring to FIG. 2, applicant's gland 24 is slipped onto the plain end of the pipe with conical cavity 30 and peripheral gland abutment 30' facing outwardly. Brass split ring 36 is slipped onto the pipe end with outer shoulder 38 of flange 34 facing outwardly and inner shoulder 38' facing inwardly. Standard mechanical joint rubber packing ring gasket 20 is then placed on the pipe and positioned, so as to leave about ¾" of the plain pipe end exposed. Split ring 36 is then positioned, so that the outer shoulder 38 of its flange 34 is pushed tightly against corresponding parallel shoulder 22' of rubber gasket 20, and the pipe is then pushed into the bell fitting with rubber gasket 20, its shoulder 22 being urged onto a first inner shoulder 18 defined within the bell socket. Gland 24 is then pushed up, and its conical surfaces 30 and 30' mate with the outside conical surfaces 32 and 38' of brass ring 36. Brass split ring 36 having been expanded as it goes over the pipe, its O.D. is now larger than the corresponding inside surfaces of gland 24. Ring 36 thus lacks ⅛" or so of completely entering the gland aperture 30 and its shoulder extension 30'. In this initial assembly step of FIG. 2, the substantial parallelism which is established between opposed contacting and corresponding surfaces of gland, split ring, gasket and bell insures the initial filling of the void between bell interior and plain pipe end. The final sealing effect of the restraining joint is most clearly shown in the sequential assembly step of FIG. 3.

Standard mechanical bolts 48, 50 are engaged through mating holes 12, 12' and 26, 26' in gland and pipe fitting. Now, as bolts 48, 50 are tightened, gland 24 is drawn inwardly toward bell 16, forcing flange outer periphery 34 of the ring 36 and its shoulder 38 against inclined rubber packing ring surface 22' thereby forcing brass ring 36 further into conical cavity 30 and extension 30' of gland 24. This assembly action continues until brass split ring 36 has thus been pushed into gland 24 completely, and ring flange shoulder 38' is integral with gland surface 30'. See FIGS. 2 and 3. The complemental, substantial parallelism of opposed contacting and corresponding surfaces of gland, split ring, gasket and bell facilitate meeting the advantages set forth below. Rubber gasket 20 is now tightly compressed into bell socket 16, and as split ring 36 is forced deeper into gland 24 conical cavity 30, 30', the split ring teeth 37 are compressed into the pipe end. Split ring 36 is now anchored within the pipe, flange periphery 34, and shoulder 38 are seated against the corresponding face 22' of gasket 20. Since no further axial movement of split ring 36 is mechanically possible, a tight restrained joint is formed.

Advantages of applicant's invention include:

1. The restrained joint works well with all standard mechanical joint bells, as described in A.N.S.I. A 21.11 —(AWWA C111) Specifications.

2. Since the brass split ring 36 is compressed evenly for 360° of the circumference of the pipe end, split ring 36 is uniquely suited for use on plastic pipe. It works equally well, however, on cast iron, steel and like metal pipes. See FIG. 2.

3. The inclined tooth 37 design allows split ring 36 to be pushed onto the pipe end very easily, but it grips tightly when pressure is applied axially in the opposite direction.

4. The restraining joint is self-adjusting. In the event that the bolts 48, 50 are not tightened enough to fully seat ring 36, any pull-out pressure will pull the ring 36 deeper into the gland conical aperture 30 and against its inclined peripheral surface 30', thus tightening the grip on the pipe end until the flange 34 comes into contact with the gland which mechanically stops further movement.

When applicant's combination of brass split ring 36 and mating gland 24 is substituted for a conventional gland in any cast iron fitting having standard AWWA Mechanical Joint, a restrained joint is produced. This precludes the need for further restraint which in the past has necessitated the use of tie rods, pouring of cement blocks, weights and the like in the municipal setting of fire hydrants, elbow fittings, and other connecting fittings. Applicant has developed styles for fitting C900 PVC pipe, as well as SDR PVC pipe. It is recommended that gland 24 be fabricated from 30,000 psi gray iron and the recommended torque on bolts 48 and 50 is 60 ft/lbs.

The gland may be made of other materials than cast iron and the split ring may be manufactured from any suitable metal or plastic capable of gripping plastic pipe.

Manifestly, the configuration of both the split ring and gland may be modified without departing from the spirit and scope of the invention.

I claim:

1. A restraining pipe joint for use in a bell and plain pipe end assembly comprising:
   a. a plain pipe end of plastic;
   b. a bell which defines an opening wall of maximum radius relative to a center line of the joint, said opening wall joining a first conical shoulder of declining radius, a second shoulder of shortest radius, joining the first shoulder rearwardly to form within the bell a recess for the plain pipe end;
   c. a gland encircling the plain pipe end, said gland defining a conical axial aperture interior wall which terminates short of its forward end forming in extension thereof an inclined interior peripheral abutment;
   d. an elongated split ring likewise encircling the plain pipe end in juxtaposition with said gland and including:
      i. a conical exterior wall complementally engageable by the conical axial aperture interior wall of said gland,
      ii. a peripheral flange in forward extension of the conical exterior wall, directed outwardly from the plain pipe end, said flange defining at its end a forwardly inclined outer shoulder of positive angle relative to the center line of the joint and an inner rearwardly inclined inner shoulder of greater positive angle than the outer said shoulder of the flange, the inner shoulder of the flange being contiguously engageable by the inclined, interior peripheral abutment of the gland.
iii. a plurality of inwardly extending pipe end gripping teeth forming the inner surface of said split-ring, and
e. a compressible gasket encircling the plain pipe end, interposed between said split ring flange and the bell, said gasket defining a forwardly inclined packing ring shoulder, engageable in parallel with the forwardly inclined outer shoulder of said split-ring flange and an inwardly inclined outer shoulder, complementally contiguous with the first shoulder of the bell;
f. tightening means interconnecting said gland and the bell compressibly securing said gasket and said split-ring assembly within the pipe joint.

2. A restraining pipe joint for use in a bell and plain pipe end assembly as in claim 1, wherein said split ring upon compression has an inner diameter less than the outer diameter of said pipe, such that said gripping teeth bite into the pipe.

3. A restraining pipe joint for use in a bell and plain pipe end assembly as in claim 1, wherein said split ring is metal.

4. A restraining pipe joint for use in a bell and plain pipe end assembly as in either claim 1, 2 or 3, wherein said split ring is brass.

* * * * *